Patented Apr. 13, 1948

2,439,375

UNITED STATES PATENT OFFICE 2,439,375

PREPARATION OF META-SUBSTITUTED PHENOLS

Erwin Schwenk, Montclair, N. J., and Domenick Papa, Brooklyn, N. Y., assignors to Schering Corporation, Bloomfield, N. J., a corporation of New Jersey No Drawing. Application October 9, 1944, Serial No. 557,933

14 Claims. (Cl. 260—521)

The present invention relates to the manufacture of phenols, and more particularly of m-substituted phenols, by the reductive splitting of an alkylidene, and especially a methylene, dioxy group attached to a benzene radical.

The preparation of compounds of the benzene series having substituents, for example alkyl, alkoxy, alkylene carboxy, and other groups, in the m-position to a hydroxyl group, or to a substituted hydroxyl group, like the methoxy, acetoxy and other functional groups, and likewise to other groups into which the phenolic hydroxy group may be readily converted, is quite difficult and the starting materials rather expensive. This is especially true of compounds of the type of β-(m-methoxy phenyl) propionic acid and similar compounds. The starting material for the preparation of such compounds is usually m-hydroxy benzaldehyde or m-anisidine, or similar compounds, all of which are comparatively costly and not readily available.

It is an object of the present invention to provide an efficient and easily controlled process whereby a phenolic hydroxyl group may be introduced into a benzene radical, and especially into a benzene which is substituted in the m-position to the position to be occupied by the hydroxyl group. It is a further object of the invention to provide a simple and economical process for the manufacture of m-substituted phenols which are difficult and costly to produce by known procedures, and particularly phenols suitable for use in the synthesis of more complex compounds. It is a still further object of the invention to provide a process whereby heretofore relatively expensive chemicals can be obtained in good yield from relatively cheap starting materials.

Other objects and advantages of the invention will appear from the following more detailed description thereof.

We have found that phenols, particularly m-substituted phenols, can be readily obtained, and in high yield, from a benzene having an alkylidene, and especially a methylene, dioxide group, for example, piperonal, safrol, isosafrol, and other compounds with a methylene dioxy bridge of natural origin, and various derivatives thereof, by the use of a reaction which selectively ruptures the alkylidene dioxide ring and replaces it with phenolic hydroxyl in the m-position to the substituent, where the latter is present. While the reaction is applicable to methylene dioxy benzene itself, which may be called the parent substance, and to homologous alkylidene compounds, like the ethylidene and propylidene dioxy benzenes, which can be prepared from the o-dihydroxy benzenes, it has its greatest usefulness with the derivatives of such compounds having a substituent in the 4-position, whereby m-substituted phenols are obtained. The invention will accordingly be more fully described in detail in connection with such derivatives, and particularly with the more readily available methylene dioxy benzenes as starting materials.

According to the invention, methylene dioxy benzenes are subjected to the reducing action of hydrogen in statu nascendi developed in alkaline solution at room or elevated temperatures and activated by a skeleton catalyst, for example, by treatment with Raney nickel-aluminum alloy in aqueous sodium hydroxide solution, which may or may not contain a water-miscible organic solvent like alcohol. We have found that this particular reduction reaction proceeds in such manner that the starting compound loses one oxygen and the methylene group from the heterocyclic ring, and the remainder of the molecule is stabilized in the form of a hydroxy compound which is obtained in unusually high yield. Thus, methylene dioxy benzene, the parent substance, yields phenol, while the derivatives of the parent substance, of the general formula

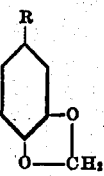

wherein R stands for any substituent, reducible or not, yield m-substituted phenols of the general formula

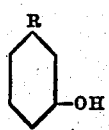

This highly efficient and selective replacement of the methylene dioxide group with a single hydroxy group in the m-position is quite unexpected in view of the fact that the usual rupture of a methylene dioxy bridge gives the corresponding dihydroxy compounds, this being accomplished by numerous known reagents. The extraordinarily high yield of the m-compounds, in many instances as high as 80%, makes the fission by hydrogen generated by a Raney type alloy all the more surprising and of outstanding commercial importance.

While the term "Raney alloy" is sometimes regarded as referring only to a nickel-aluminum alloy, and even to such an alloy of specific composition, the alloys useful in the present process may be of quite varied composition, but have in common the presence of a catalytically acting metal which is particularly active in the form of a skeleton catalyst, and likewise the presence of a metal which will liberate hydrogen in alkaline solution, which the first metal will not ordinarily do. The term "Raney alloy" as used herein accordingly includes not only nickel-aluminum alloys, but also other alloys having similar properties, such as those disclosed in the patent to Raney No. 1,915,473; and we shall employ the expression "Raney type alloy" herein to designate an alloy containing the catalytic metal and the hydrogen-generating metal just referred to.

The present invention accordingly provides an efficient and economical process for the manufacture of m-substituted phenols and their substituted hydroxy and other derivatives by the use of readily available or synthesizable and inexpensive substances like piperonal and its derivatives, many of such phenols not being readily obtainable by known procedures.

The reaction probably takes the following course:

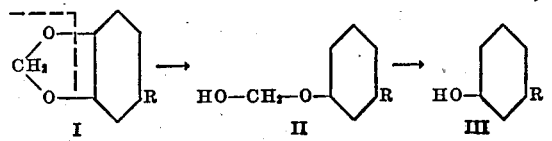

The parent compound (R=H) of this series, as already indicated, gives phenol; whereas m-cresol was obtained from piperonyl alcohol (R=CH$_2$OH) and from piperonal (R=CHO). It is quite likely that the heterocyclic ring opens as indicated in I, and the intermediate compound II is hydrogenolyzed into methyl alcohol and the corresponding phenol III.

The ring rupture of the methylene dioxy bridge by the action of Raney's alloy and aqueous alkali can be applied to the preparation of numerous intermediates which are suitable for the synthesis of cyclopentano polyhydro phenanthrenes. For example, β-(m-methoxy phenyl) ethyl bromide is one of the important intermediates required for the construction of the 1-keto-7-methoxy octahydrophenanthrene. This substituted ethyl bromide can be readily prepared from m-methoxy phenyl acetic acid which is made by the use of the reduction method of the present invention and is then converted to the desired intermediate, as follows:

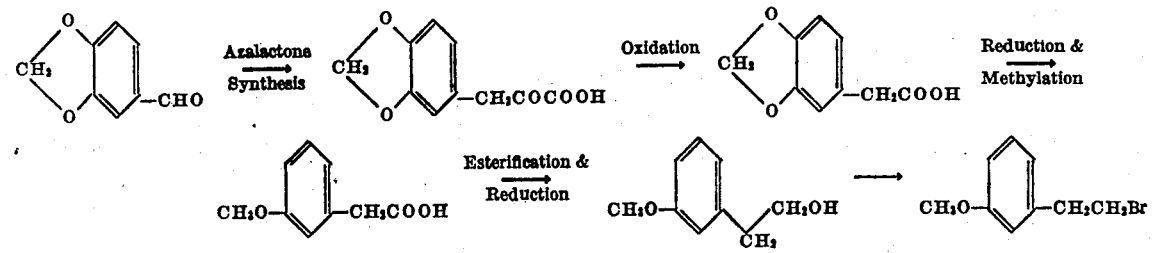

In many experiments on the synthesis of estrone intermediates, γ-(m-methoxy phenyl) butyric acid is one of the intermediates which has found considerable application for the construction of the octahydro phenanthrene ring system. By the use of β-(m-methoxy phenyl) ethyl bromide which is prepared as described above, this substituted butyric acid can be readily obtained, as by the following reaction:

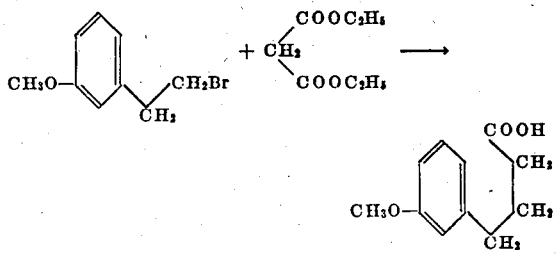

The reactions which have been outlined above illustrate the application of this reduction method to just one phase of synthetic chemistry. Other applications in synthetic chemistry for the preparation of compounds which are otherwise difficult to prepare can be readily understood. For example, it will be possible to prepare 2,7-dihydroxy phenanthrene by the use of this reduction method via the Pshorr reaction:

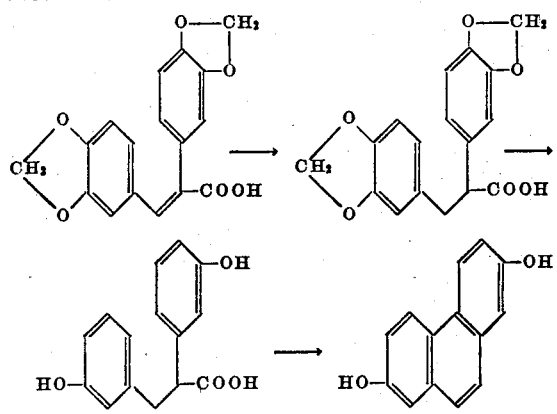

Other applications of our reaction will readily occur to those skilled in the art.

While various hydrogen-generating alloys may be used, best results have generally been obtained with nickel-aluminum and copper-magnesium alloys.

As will be evident from the foregoing, the reaction of the present invention is independent of the nature of the substituent R, whether or not it undergoes simultaneous reduction, and so far as our investigations show, it may be practically any group, although from the practical standpoint it is limited by the degree of availability of the starting compounds to a relatively small number of groups or radicals. Thus R may be alkyl, alkoxy, aldehydo, aralkyl, carboalkyl, carboxy, alkylene-carboxy, alkenylene-carboxy, carbo-alkylene-carboxy, alkenylene halide, alkenyl, etc. and, as indicated, the substituents may be saturated or unsaturated. Among the possible specific substituents may be mentioned CH$_3$, CH$_2$OH, CHO, COCH$_3$, COOH, CH$_2$COOH, CH=CH—COOH, COCH₂CH₂COOH, CH=CH.Cl, CH=CH₂, NO₂, etc.

Illustrative examples of our improved procedure are presented below.

Example I 10 g. 1,2-methylene dioxy benzene were mixed with 500 cc. 10% sodium hydroxide in a 1-liter, r. b. flask equipped with a condenser. To this mixture, which contained 25 cc. of ethyl alcohol as a solvent, there were added in the course of an hour and a half 25 g. of Raney's nickel-aluminum alloy. The addition was made at a temperature of about 60–90° C. After all the alloy had been added the reaction mixture was heated for a period of about two hours with frequent shaking. The reaction mixture was then cooled, filtered from the nickel and the nickel washed twice with hot water. The combined filtrate and washings were acidified to Congo paper with conc. HCl and exhaustively extracted with ether. On evaporation of the ether there were obtained 5.2 g. of phenol which was identified through its aryloxy derivative.

Example II 10 g. of 3,4-methylene dioxy toluene were reduced as described in Example I. After acidification of the reaction mixture it was extracted with chloroform which yielded 3.1 g. of meta-cresol identified through its aryloxy derivative. From the alkaline solution there were isolated 3.7 g. of the starting material.

Example III 10 g. of piperonyl alcohol were reduced as described in Example I. A 75% yield of meta-cresol was obtained.

Example IV 10 g. of piperonal, when reduced as described in Example I, yielded 60% of meta-cresol. It was unnecessary to use any solvent in this reduction since piperonal has a fair solubility in water. It is advisable when reducing piperonal to avoid excessive heat since under these experimental conditions it has a tendency to undergo the Cannizzaro reaction.

Example V 83 g. of piperonylic acid were dissolved in 1200 cc. of water containing 150 g. of sodium hydroxide. The reaction mixture was heated to about 50° C. and 100 g. of Raney nickel-aluminum alloy were added in the course of 3 to 4 hours with stirring. At the end of the addition the reaction mixture was heated to 90° with stirring for about 3–5 hours. The hot solution was filtered from the suspended nickel and washed with water. The filtrate and washings were acidified to Congo paper with concentrated hydrochloric acid. After thoroughly chilling, the precipitated meta-hydroxy benzoic acid was filtered. The product obtained melted at 201–202°. An additional amount of the meta-hydroxy benzoic acid may be obtained by extraction of the filtrate with ether.

Example VI 96 g. (0.5 m.) of β-piperonyl acrylic acid (β-[3,4-methylene dioxy phenyl] acrylic acid) were reduced as described in Example V. After acidification of the alkaline solution the meta-hydroxy hydrocinnamic acid was isolated by extraction with butyl ether. After recrystallization from benzene the substance was obtained in a yield of 80%. An additional amount of the meta-hydroxy hydrocinnamic acid may be obtained by concentration of the recrystallization solvent.

Example VII 10 g. of 3,4-methylene dioxy phenyl acetic acid, which is obtained from the azalactone of piperonal, were reduced as described in Example V. The isolation of the reduction product in this case is somewhat difficult because of the extreme solubility of meta-hydroxy phenyl acetic acid in water. After acidification of the alkaline solution, complete extraction of the meta-hydroxy phenyl acetic acid is readily accomplished by a liquid extractor like ether. An alternative procedure for the isolation of the acid is to saturate the acidified solution with salt and extract with four 100 cc. portions of ether.

In place of an alloy containing the catalytic and the hydrogen-generating metals, there may be used the component metals, i. e. in the free, unalloyed condition, except that the hydrogen non-generating metal, e. g. nickel, copper, manganese, etc., is first prepared by converting an alloy of such metal with an alkali-reactive metal into the skeleton catalyst form by treatment with alkali. Among the metals that may be used as the hydrogen generating component are aluminum, magnesium and calcium. After a Raney type alloy as hereinbefore defined has been used in our process, the separated skeleton catalyst can be used with, for example, powdered aluminum and alkali for treating a new batch of starting material.

We claim:

1. Process for the manufacture of phenols, which comprises subjecting a 1.2 methylene dioxy benzene to reductive splitting with a Raney type alloy and alkali solution to replace the methylene ether group with a phenolic hydroxyl group.

2. Process for the manufacture of phenols, which comprises subjecting a 1,2-methylene dioxy benzene substituted in the 4-position by a carboxylic acid group to reductive splitting with a Raney type alloy and aqueous alkali to replace the methylene ether group with a phenolic hydroxyl group in the m-position to the 4-substituent.

3. Process for the manufacture of phenols which comprises subjecting a 1,2-methylene dioxy benzene substituted in the 4-position by a side chain containing a double bond, to reductive splitting with a Raney type alloy and aqueous alkali to replace the methylene ether group with a phenolic hydroxyl group in the m-position to the side chain, the double bond of said side chain being reduced during the course of the reaction.

4. Process for the manufacture of phenols, which comprises subjecting 3,4-methylene dioxy phenyl acetic acid to reductive splitting with a Raney type alloy and aqueous alkali to replace the methylene ether group with a phenolic hydroxyl group, whereby m-hydroxy phenyl acetic acid is formed.

5. Process for the manufacture of phenols which comprises subjecting a methylene dioxy benzene to reductive splitting with a Raney nickel-aluminum alloy and aqueous sodium hydroxide with the application of heat to replace the methylene ether group with a phenolic hydroxyl group.

6. Process according to claim 5, wherein the benzene compound is β-piperonyl acrylic acid, whereby meta-hydroxy hydrocinnamic acid is formed.

7. Process according to claim 5, wherein the benzene compound is 3,4-methylene dioxy phenyl acetic acid, whereby meta-hydroxy phenyl acetic acid is formed, and including the step of extracting such product from the reaction mixture with the aid of a water-immiscible organic solvent.

8. Process according to claim 5, wherein the benzene compound is 3,4-methylene dioxy phenyl acetic acid, whereby meta-hydroxy phenyl acetic acid is formed, and including the step of extracting such product from the reaction mixture with the aid of an organic solvent after saturating the acidified reaction mixture with a soluble salt.

9. In a process for the manufacture of β-(m-methoxy phenyl) ethyl bromide, the step which comprises subjecting 3,4-methylene dioxy phenyl acetic acid to reductive splitting with a Raney type alloy and aqueous alkali to replace the methylene ether group with a phenolic hydroxyl group in the m-position.

10. Process for the manufacture of phenols, which comprises subjecting an alkylidene dioxy benzene to reductive splitting with a Raney type alloy and alkali solution to replace the alkylidene ether group with a phenolic hydroxyl group.

11. Process for the manufacture of phenols, which comprises subjecting a suspension of an alkylidene dioxy benzene to the action of hydrogen developed in such suspension and activated by the presence of a skeleton metal hydrogenation catalyst of the Raney type.

12. Process for the manufacture of phenols, which comprises subjecting an alkylidene dioxy benzene in suspension in an alkalene solution to the action of hydrogen developed in such solution by the action of a metal and activated by the presence of a skeleton metal hydrogenation catalyst of the Raney type, said metals being alloyable with each other.

13. Process for the manufacture of phenols, which comprises subjecting an alkylidene dioxy benzene in suspension in an alkaline solution to the action of hydrogen developed in such solution by aluminum and activated by the presence of a skeleton metal catalyst of the group consisting of nickel, copper and manganese.

14. Process for the manufacture of phenols, which comprises subjecting a methylene dioxy benzene suspended in an alkali solution to the action of hydrogen developed in such solution by the action of a metal and in the presence of a skeleton metal hydrogenation catalyst of the Raney type.

ERWIN SCHWENK.
DOMENICK PAPA.

REFERENCES CITED

The following references are of record in the file of this patent:

UNITED STATES PATENTS

| Number | Name | Date |
|---|---|---|
| 2,046,011 | Amend | June 30, 1936 |